United States Patent [19]
Byron

[11] Patent Number: 5,191,628
[45] Date of Patent: Mar. 2, 1993

[54] OPTICAL AMPLIFIERS

[75] Inventor: Kevin C. Byron, Bishop's Stortford, United Kingdom

[73] Assignee: Northern Telecom Limited, Montreal, Canada

[21] Appl. No.: 783,824

[22] Filed: Oct. 29, 1991

[30] Foreign Application Priority Data

Nov. 9, 1990 [GB] United Kingdom ............... 9024393

[51] Int. Cl.$^5$ .......................... G02B 6/00; G02B 6/36
[52] U.S. Cl. ..................................... 385/27; 359/134
[58] Field of Search ............... 385/27, 39; 359/134, 359/160

[56] References Cited

U.S. PATENT DOCUMENTS

| | | | |
|---|---|---|---|
| 4,558,921 | 12/1985 | Hasegawa et al. | 385/39 X |
| 4,633,524 | 12/1986 | Hasegawa | 359/134 |
| 4,700,339 | 10/1987 | Gordon et al. | 359/134 |
| 4,741,587 | 5/1988 | Jewell et al. | 385/1 |
| 4,881,788 | 11/1989 | Doran | 385/27 X |
| 5,035,481 | 7/1991 | Mollenauer | 385/24 X |

FOREIGN PATENT DOCUMENTS 2116391 9/1983 United Kingdom .
2151868 7/1985 United Kingdom .

Primary Examiner—Akm E. Ullah
Attorney, Agent, or Firm—Lee, Mann, Smith, McWilliams, Sweeney & Ohlson

[57] ABSTRACT

A practical fibre Raman amplifier for soliton systems which employs conventional transmission fibre (4) and a pulsed pump source (3). The pump source only requires a relatively low mean power level but must be capable of providing sufficiently high peak output power pulses at intervals corresponding to the intervals between solitons whereby to amplify the latter. A conventional mode-locked laser diode source can achieve this at the requisite wavelength. The use of such a pulsed pump source is possible since the solitons have to be spaced at intervals approximately 8 to 10 times their pulse width in order to avoid interaction problems. Conventionally, Raman amplification requires high means power continuous wave pump sources and suitable laser diode sources are not available at the requisite wavelengths.

5 Claims, 1 Drawing Sheet

OPTICAL AMPLIFIERS

BACKGROUND OF THE INVENTION

This invention relates to optical amplifiers and in particular to fibre Raman amplifiers.

Fibre Raman amplifiers generally employ an optical pump signal which is continuous wave and of an appropriate wavelength, one or more Stokes shift away from the wavelength of the signal to be amplified. For example a 1.46 micron pump for amplification of a 1.55 micron signal. An input data stream signal and the pump signal interact in a conventional transmission fibre and gain is achieved in the data stream signal by the Raman effect. Fibre Raman amplifiers have not received much attention since the introduction of erbium fibre amplifiers since the latter are much more power efficient. The same order of gain can be achieved for at least an order of magnitude less mean power. Raman fibre amplifiers require a pump source giving typically 200 mW continuous light whereas erbium fibre amplifiers require about 20 mW for the same gain.

SUMMARY OF THE INVENTION

According to the present invention there is provided a fibre Raman amplifier for soliton systems comprising a length of optical fibre capable of transmitting solitons, means for providing and coupling a soliton stream to one end of the fibre, and means for providing and coupling a pulsed pump signal to said one end of the fibre, the solitons and the pulsed pump signal being such that Raman amplification of the solitons takes place during transmission along the fibre.

Preferably the pulsed pump signal provision means comprises a mode-locked source having a relatively low mean output power but being capable of providing sufficiently high peak output power pulses at intervals corresponding to the intervals between the solitons whereby to amplify the solitons.

In order to overcome pulse walk-off problems the soliton wavelength is greater than the zero dispersion of the fibre by a predetermined amount, and the pulsed pump signal is less than the zero dispersion wavelength by substantially said predetermined amount.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
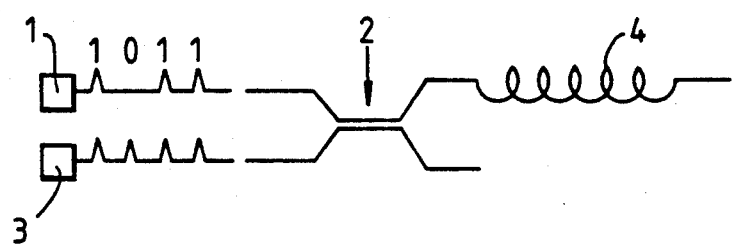
FIG. 1 illustrates, schematically a soliton fibre Raman amplifier, FIG. 2 indicates the variations in dispersion with wavelengths.

As discussed above fibre Raman amplifiers require high mean pump powers. Laser diode pump sources capable of producing such mean powers have not materialised. Soliton systems are presently of considerable interest for long haul telecommunications systems. In an ideal soliton system, a pulse propagates down a fibre and suffers no dispersion since there is a dynamic balance between the new frequency components developed by self-phase modulation and the negative group velocity dispersion. The negative dispersion causes the newly generated high frequency components to speed up relative to the lower frequency components thereby causing the pulse to retain its shape. Unfortunately, "ideal" conditions require that the fibre is lossless i.e. zero attenuation. Since the losses in a fibre are finite, some form of optical amplification is required to overcome the losses. With optical amplifiers it is possible to boost a pulse, which has reached the point where it is losing its soliton characteristics, back to being a soliton again. The choices of amplifiers are semiconductor laser, erbium fibre and Raman fibre amplifier. The most commonly employed are the semiconductor laser and erbium fibre, both of which are "lumped" amplifiers, that is to say discrete "devices" spliced into the transmission fibre at regular intervals. Our co-pending GB Application No. 9024392.4 (Ser. No. 2249660A) (K C Byron 42) corresponding to U.S. application Ser. No. 07/783881 filed Oct. 29, 1991 now pending, describes a distributed optical amplification schemes whereby the fibre is caused to appear substantially lossless over at least part of its length whereby to achieve longer spaces between repeaters (amplifiers) than hitherto.

In soliton systems the soliton pulses have to be separated by a delay of the order of 8 to 10 times the pulse width in order to inhibit the effects of collisions arising from the finite amount of energy in the pulse tails. If the pulses get any closer they start catching one another up due to interaction therebetween. With conventional Raman fibre amplification using a continuous wave pump a considerable amount of energy between the soliton pulses would be wasted even if pump sources with a sufficiently high mean power (continuous wave) were to become available and could be used. However, Raman amplification is a very fast process, of the order of picosecond speed and thus soliton pulses which are necessarily spread out could be pulse amplified using Raman amplification. Thus instead of requiring a continuous wave pump source with a high mean power it is proposed to use a pulsed pump source with a low mean power level but a high peak power for a very short time at intervals corresponding to the soliton spacing. Calculations show that with a delay between soliton pulses ten times the soliton pulse width, the mean power required from the pump source is ten times less than required previously, so that instead of being 200 mW, the same figure as required for an erbium system, i.e. 20 mW, can be employed whilst achieving the same gain. A peak power of say 200 mW is still required but at such long intervals and for such short times that the laser source will not be adversely affected, since a lot of power is not being required all of the time.

Typically for soliton pulses of say 20 psec width and a delay between pulses of eight times their width, the implied bit rate for stable transmission is $1/(8 \times 20 \times 10^{-12}) = 6.25$ Gbit/s. If the soliton signal is at 1.56 microns, a pump wavelength of 1.47 microns can be used. A suitable pump source for this is a mode-locked diode laser having a mean output power of 30 mW. Such a device is well within the capabilities of current devices. Such a device would also have a peak output power of 300 mW, giving sufficient gain for a fibre repeater length of 100 Km and would allow stable soliton transmission over several thousand Km.

Figure 2:
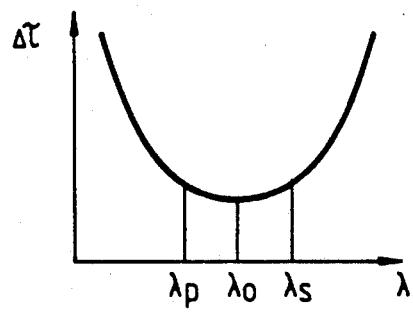

A problem that arises from using such a pulsed pump is pulse walk-off due to dispersion. The pump and signal are at totally different wavelengths and due to dispersion they can pass through one another and separate since they have different delays down the fibre. This can be easily remedied by choice of fibre design and the pump and signal wavelength. In soliton systems the soliton wavelength $\lambda_s$ is chosen to be greater than the zero dispersion wavelength $\lambda_o$ (FIG. 2), and the pump wavelength $\lambda_p$ is chosen to be shorter than $\lambda_s$ and $\lambda_o$. In order to overcome pulse walk-off problems $\lambda_o$ should be approximately half-way between $\lambda_p$ and $\lambda_s$ and then the pump and soliton pulses will stay close together all along the fibre.

FIG. 1 illustrates schematically an embodiment of soliton fibre Raman amplifier. A data stream (1011) is output from a suitably modulated soliton source 1 and input to one arm of a fibre coupler 2. To the other input arm of coupler 2 is applied the output of a mode-locked (pulsed) pump source 3. A conventional single mode transmission fibre 4, with a specified $\lambda_o$ as described above, in which the soliton amplification is achieved, is connected to one output arm of coupler 2. The timing of the pulses from pump source 3 is such that they are synchronised with the soliton pulses in order to achieve amplification in fibre 4. It should be noted that amplification can be achieved with the proposed arrangement even if there is pulse walk-off i.e. the wavelengths are not chosen in order to avoid pulse walk-off problems. The amplifier will clearly not be as efficient as when pulse walk-off effects are specifically avoided. Soliton systems have high bit rates, i.e. short pulses and thus the interaction distance between the pump and the signal with walk-off will be shorter than without it so that the achieved gain is lower.

Figure 3:
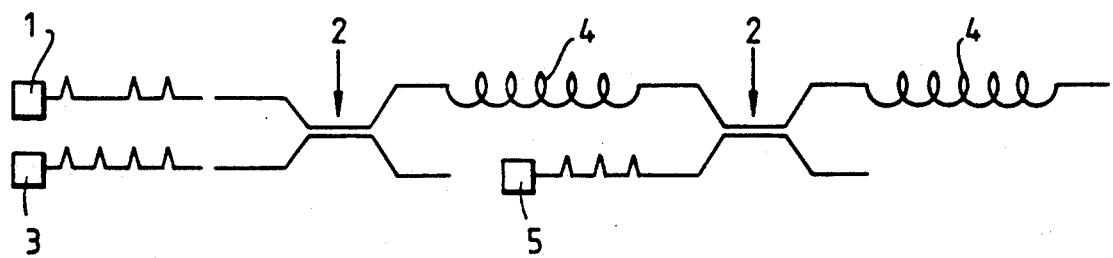
FIG. 3 illustrates, schematically, a long haul soliton transmission system including two soliton Raman amplifiers.

In a long haul transmission system where there are a series of repeaters (amplifiers) as indicated in FIG. 3, the output of respective mode-locked sources (pump) being coupled to the transmission fibre 4 at intervals along its length, the pump pulses from each successive source such as 5 must also be in synchronism with the incoming soliton pulses. This can be achieved at each repeater by recovering the clock from the pump signal output from the previous pump and using it to drive the mode-locked source thereat. Thus the overall system is synchronised from the pump point of view and the soliton signals are constantly accompanied by a pump pulse all along the system.

As energy is transferred from a pump pulse to a soliton pulse the pump pulse itself becomes depleted and suffers loss due to the fibre attenuation, and this places a limit on the spacing between repeaters. However it is possible to extend this spacing by pumping the pump i.e. employing a two-stage Raman amplification process. A two-step Raman amplification process has recently been proposed by The Optical Sciences Centre, The Australian National University, Canberra, ACT 26-1, Australia (see, for example, Electronic Letters, 1st Mar. 1990, Vol 26, No. 5, pp. 334–336, G D Peng "Step by Step BSRS amplification in long span optical fibre communication"). Using the two-step Raman amplification two pumps are required, one at $\lambda_p$ in the example shown in FIG. 2 and one at a shorter wavelength $\lambda_{pl}$. $\lambda_{pl}$ is one Stokes shift from $\lambda_p$ and two Stokes shift from $\lambda_s$. The pump at $\lambda_p$ is amplified by the pump at $\lambda_{pl}$ but at the same time the pump at $\lambda_p$ is amplifying the signal at $\lambda_s$.

Thus the pump at $\lambda_p$ is being replenished by the pump at $\lambda_{pl}$ and gain is obtained at $\lambda_s$. By definition both pump wavelengths cannot both be equalised for on the delay curve. However the additional pump ($\lambda_{pl}$) being at a shorter and more usual laser wavelength can be readily provided, such as by a NdYAG laser or Nd doped fibre lasers with different hosts, for example silica or fluorides, and in that case it can be continuous wave rather than pulsed as was required for peak power reasons for the first pump ($\lambda_p$) and walk-off is not a problem. Thus an amplifier may involve a continuous wave first pump (NdYAG at 1.319 microns), a second pulsed pump at 1.46 microns and a soliton wavelength of the order of 1.55 microns.

In summary, therefore, the invention provides a practical fibre Raman amplifier for soliton systems which employs conventional transmission fibre and a pulsed pump source. The pump source only requires a relatively low mean power level but must be capable of providing sufficiently high peak output power pulses at intervals corresponding to the intervals between solitons whereby to amplify the latter. A conventional mode-locked laser diode source can achieve this at the requisite wavelength. The use of such a pulsed pump source is possible since the solitons have to be spaced at intervals approximately 8 to 10 times their pulse width in order to avoid interaction problems. Conventionally, Raman amplification requires high mean power continuous wave pump sources and suitable laser diode sources are not available at the requisite wavelengths.

I claim:

1. A fibre Raman amplifier for soliton systems comprising a length of optical fibre capable of transmitting solitons, means for providing and coupling a soliton stream to one end of the fibre, and means for providing and coupling a pulsed pump signal to said one end of the fibre, the solitons and the pulsed pump signal being such that Raman amplification of the solitons takes place during transmission along the fibre.

2. A fibre Raman amplifier as claimed in claim 1 wherein the pulsed pump signal provision means comprises a mode-locked source having a relatively low mean output power but being capable of providing sufficiently high peak output power pulses at intervals corresponding to the intervals between the solitons whereby to amplify the solitons.

3. A fibre Raman amplifier as claimed in claim 1 wherein the zero dispersion wavelength of the fibre is $\lambda_o$, wherein the soliton wavelength is greater than $\lambda_o$ by a predetermined amount and wherein the pulsed pump signal wavelength is less than $\lambda_o$ by substantially said predetermined amount.

4. A fibre Raman amplifier as claimed in claim 3 and comprising means for providing and coupling a second pump signal to the optical fibre, the second pump signal being at a shorter wavelength than said pulsed pump signal and being continuous wave.

5. A long haul soliton transmission system including a plurality of concatenated fibre Raman amplifiers as claimed in claim 1.

* * * * *